United States Patent [19]

Nineberg

[11] 4,235,045
[45] Nov. 25, 1980

[54] X-RAY FILM CASSETTE PASS-THROUGH

[75] Inventor: Edward Nineberg, Evanston, Ill.

[73] Assignee: Consolidated International Corp., Chicago, Ill.

[21] Appl. No.: 915,598

[22] Filed: Jun. 15, 1978

[51] Int. Cl.³ .............................................. E06B 3/34
[52] U.S. Cl. ....................................... 49/41; 250/517
[58] Field of Search ................. 414/217, 287; 193/33, 193/34; 232/42.3, 42.4; 250/515, 517; 198/523; 49/39–41

[56] References Cited

U.S. PATENT DOCUMENTS

| 2,577,401 | 12/1951 | Calcutt et al. | 233/43.3 X |
| 3,407,964 | 10/1968 | Wysocki et al. | 198/523 X |
| 3,566,113 | 2/1971 | Balanca et al. | 414/287 |
| 3,893,259 | 7/1975 | Nineberg | 49/41 |

Primary Examiner—Robert G. Sheridan
Attorney, Agent, or Firm—Emrich, Root, Lee, Brown & Hill

[57] ABSTRACT

A pass-through structure for enabling objects to be transferred through a dividing wall from one area to another is disclosed wherein an outer drum is provided with opposed openings, one on each side of the dividing wall, and an inner drum provided with one opening is rotatably mounted within the outer drum so that, when the opening in the inner drum is aligned with an opening in the outer drum, objects may be placed therein and the inner drum rotated so that the opening therein comes into alignment with the opening in the outer drum whereby the objects therein may be removed. One or both of the drums may be lead-lined when X-ray film cassettes are the objects being transferred. Latch means are provided to lock the inner drum in at least one of its rotated positions. Left- and right-hand compartments are also provided within the drums so that, for example, exposed X-ray film cassettes may be placed in the right-hand compartment so that a person on the opposite side of the dividing wall may remove such cassettes and, from his viewpoint, they will be removed from the left-hand compartment.

8 Claims, 4 Drawing Figures

X-RAY FILM CASSETTE PASS-THROUGH

BACKGROUND OF THE INVENTION

Pass-through structures have been known heretofore wherein objects could be transferred from one area to another, or from one room to another through a dividing wall. However, they were not suitable for passing through objects such as X-Ray film cassettes, where certain precautions were necessary. For example, unexposed X-ray film requires lead-lined protection when being transferred.

Furthermore, in the pass-through structures heretofore known, there was no way to prevent a person on one side of such a dividing wall from rotating the inner drum inadvertantly or prematurely before exposed film might have been placed within the structure.

The present structure is designed with features which make it particularly applicable for use in transferring X-ray film cassettes from one area to another, although its usefulness is not necessarily limited to that purpose. It is considered that the lead-lining of one or both drums and the latch means are essential for the purposes of this invention. Other improvements have been made, as will appear more fully hereinafter.

BRIEF SUMMARY OF THE INVENTION

The present invention relates generally to pass-through structures for passing objects from one area to another through an opening in a dividing wall. The structure is provided with an outer drum which is provided with suitable means to enable it to be mounted within an opening in a dividing wall. The outer drum has two openings in the wall thereof, preferably in opposition to each other, so that objects placed therein by a person on one side of the wall may be removed therefrom by a person on the other side of the wall.

An inner drum is mounted for rotation within the outer drum and has a single opening in the wall thereof. In one rotated position of the inner drum the opening therein may be brought into alignment with one of the openings of the outer drum. A bottom, or other supporting surface, is provided within the drums on which to support an object placed therein. The inner drum may then be rotated to bring the single opening in the wall thereof into alignment with the second opening in the outer drum located on the opposite side of the dividing wall. At that point, a person on the opposite side of the wall may remove the objects placed therein.

Latch means are provided to lock the inner drum against rotation in at least one of the rotated positions thereof, and preferably in both of its rotated positions.

Also, one or both of the drums may be lead-lined to enable X-ray film cassettes to be transferred from one area to another.

In view of the foregoing, it is therefore one of the principle objects of the present invention to provide a pass-through structure wherein objects may be placed therein on a supporting surface and wherein a rotating inner drum may be rotated between a first position in which objects are placed within the structure, and a second position wherein objects may be removed from the structure.

A further object of the invention is to provide a pass-through structure, particularly adapted for use in transferring exposed X-ray film cassettes from one area to another through a dividing wall, and wherein latch means are provided to prevent any inadvertant rotation of the inner drum, and to prevent any rotation by a person on either side of a dividing wall.

Still another object of the invention is to provide a structure for transferring objects, such as X-ray film cassettes, from one area to another through a dividing wall, and wherein the interior of the structure is divided into two compartments, one on the left side and one on the right side, whereby objects to be transferred may be placed on one side thereof and removed from the same side on the opposite side of a dividing wall, so that the operators thereof will know that if the objects are in the left-hand compartment as he faces the pass-through structure, they are to be removed.

Other objects and purposes of the invention will appear more fully hereinafter, reference being had to the accompanying drawings.

DETAILED DESCRIPTION OF THE INVENTION

Figure 1:
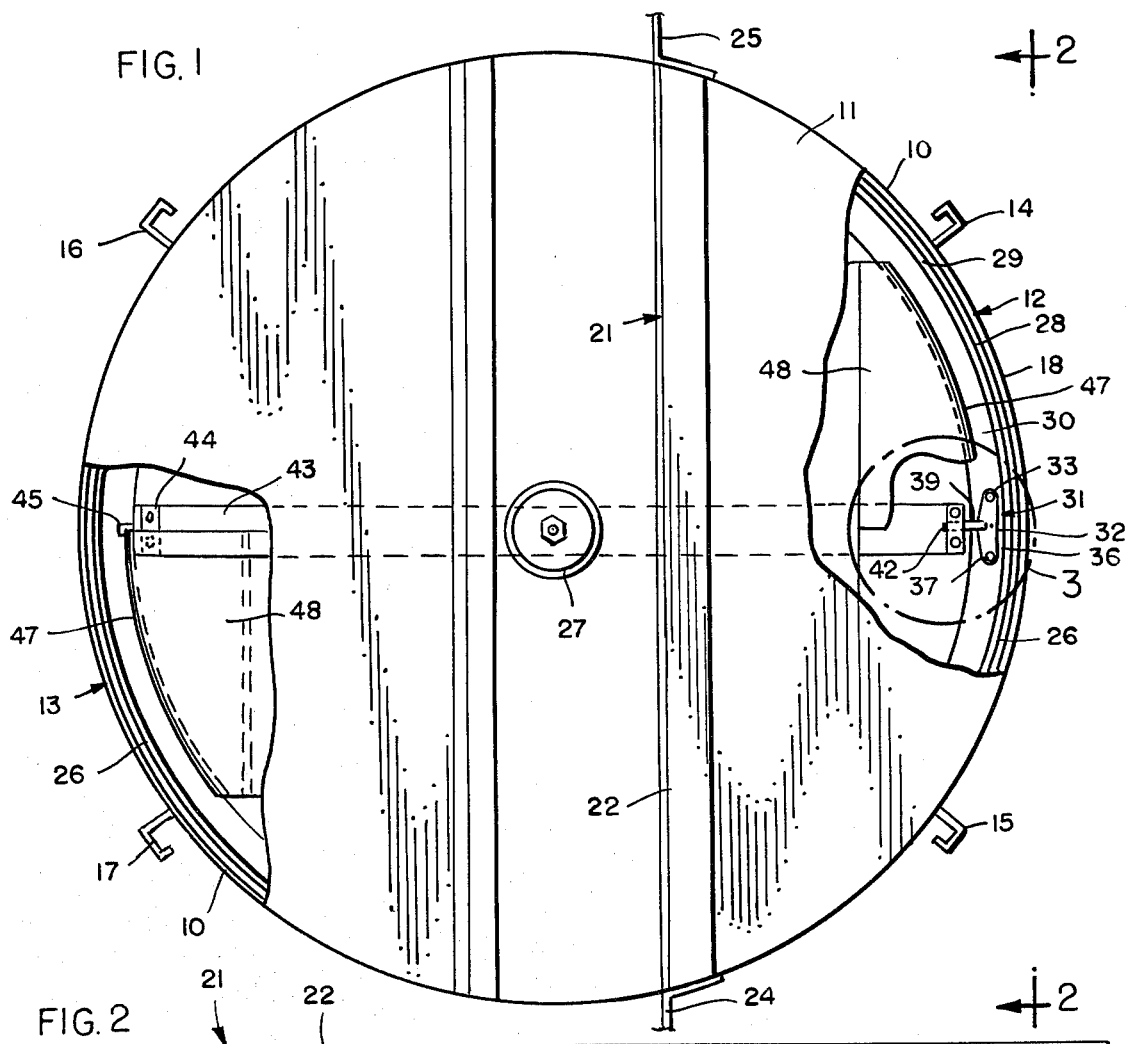
FIG. 1 is a top plan view of a pass-through structure embodying the present invention, with certain parts broken away for the sake of clarity.
Figure 2:
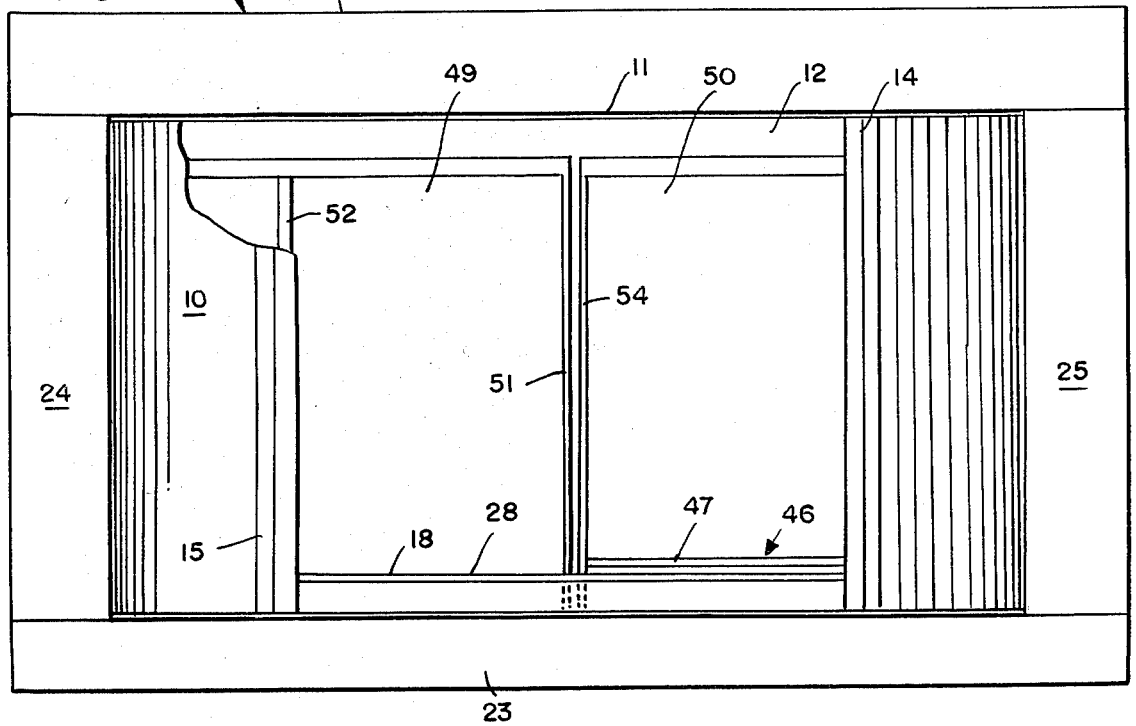
FIG. 2 is a front elevational view thereof looking in the direction of the arrows 2—2 of FIG. 1.

Referring now more particularly to the drawings and especially FIGS. 1 and 2 thereof, the pass-through structure of the present invention is illustrated therein as comprising an outer drum 10 which is preferably circular in configuration. This outer drum 10 has a top or cover member thereon indicated by the numeral 11. Two openings are provided in the wall of the outer drum 10, one of which is indicated generally by the numeral 12, and other of which is indicated generally by the numeral 13. These two openings are preferably disposed opposite each other.

The opening 12 is defined on the sides thereof by the vertically extending angle members 14 and 15. The opening 13 is defined on each side thereof by the vertically extending angle members 16 and 17. The bottom of the opening 12 is defined by the edge 18. The lower edge of the opening 13 is similarly defined.

The lower end of the outer drum 10 is provided with an inwardly extending annular flange member 19 (see FIG. 4), and the entire drum is then supported upon a bottom member 20.

A mounting frame, generally indicated by the numeral 21, is secured to the outer drum 10 so that the structure may be mounted within an opening of a suitable dividing wall, whereby the mounting frame is secured to the wall around the opening therein. The frame 21 is preferably formed of angle members, the angle member which extends across the top 11 of the outer drum 10 being indicated by the numeral 22. It will be noted that the vertical leg of this angle member 22 extends outwardly at each end thereof beyond the wall of the drum 10. This may be more clearly seen in FIG. 2.

The bottom such angle member of the mounting frame 21 is indicated by the numeral 23, while the vertical angle members which provide the ends of the mounting frame are indicated by the numerals 24 and 25.

The structure is also provided with an inner drum 26, which is rotatably mounted within the outer drum 10. This inner drum may be mounted for rotation in any suitable manner, but it is preferred that it be suspended from a rotatable bearing member 27, preferably of the form shown in my U.S. Pat. No. 3,893,259. The details of this bearing structure form no part of the present invention, but the aforementioned patent may be referred to for such details if it is so desired.

This inner drum 26 has an opening in the wall thereof, which is preferably of about the same size as the openings 12 and 13 in the wall of the outer drum. The bottom of this opening in the inner drum is defined by the edge 28 (FIGS. 1 and 4), and one of the vertical edges may be seen in FIG. 1 and is indicated by the numeral 29.

Thus far, the structure described herein is what has heretofore been known in the prior art. Such a structure has been mounted heretofore in the opening of a dividing wall. When the opening in the inner drum is brought into alignment with the opening 12, for example, objects may be placed through the aligned openings onto the bottom 20. The outer drum and the bottom are stationary members, and the inner drum may be then manually rotated to a position where the opening therein is brought into alignment with, for example, the opening 13 on the opposite side of the dividing wall. At that point a person on the other side of the wall may reach through the aligned openings and remove the objects which had been placed therein.

Figure 3:
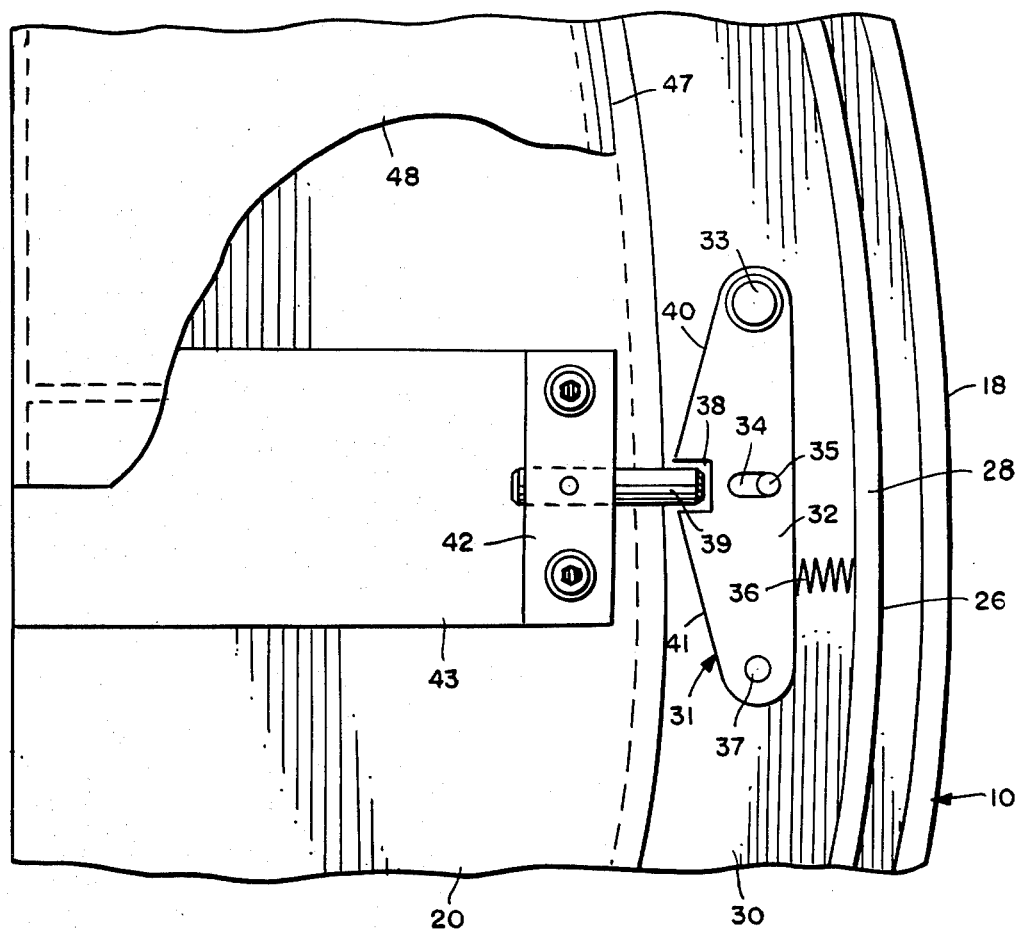
FIG. 3 is an enlarged fragmentary plan view of one of the latching devices, and is an enlargement of the structure enclosed by the dot-dash circle indicated by the numeral 3 in FIG, 1.

When the objects to be transferred from one area to another are X-ray film cassettes, it is preferable that one or both of the drums be lead-lined. In addition thereto, however, it is advisable to provide some locking means to prevent rotation of the inner drum, which locking means, however, should be of a releasable nature, so that when a person has exposed X-ray film cassettes to be developed, for example, he may place these cassettes through the aligned openings on one side of the dividing wall and be assured that the person on the opposite side of the wall will not be able to rotate the inner drum. To accomplish this purpose, suitable latching means have been provided as may be seen in FIGS. 1, 3 and 4.

The inner drum 26 is provided around the lower edge thereof with an inwardly-extending annular flange 30. A yieldable detent member, generally indicated by the numeral 31, is mounted on the flange 30 in such position that it may be manipulated by a person inserting his hand through the aligned openings. The latch member may take anyone of a number of forms, but preferably it includes an arm 32 pivotally mounted for rotation about the pin 33. Intermediate the ends of the arm 32 there is provided a transversely extending slot 34 through which a pin 35 extends upwardly from the flange 30. A coiled tension spring 36 is secured at one end to the wall of the inner drum 26 and at its other end, it is suitably attached to the arm 32. As may be seen in FIG. 3, the spring normally urges the arm 32 in a clockwise direction around the pivot 33 to the position shown wherein the pin 35 is at the right-hand end of the slot 34, thereby limiting the movement of the arm in the clockwise movement to which it is urged by the spring 36.

A knob 37, or other suitable means which may be grasped by the operator, extends upwardly from the arm 32 at the end thereof opposite the pivot 33. The inner edge of the arm 32 is provided with a recess 38 to receive a locking pin 39, the details of which will be described hereinafter.

The inner edge of the arm 32 is provided with two inclined surfaces 40 and 41 which may act as cam surfaces, so that when the inner drum is being rotated, one or the other cam surface 40 or 41, depending upon in which direction the inner drum is being rotated, will come against the stationary pin 39 and will thereupon cam the arm 32 in a counter-clockwise direction against the pressure of the spring 36. When the recess 38 reaches a position opposite the pin 39, the spring 36 will urge the arm 32 in a clockwise direction and the end of the pin 39 will be received within the recess 38, thereby locking the inner drum against inadvertant rotation.

When it is desired to manually release the latching mechanism, the knob 37 may be grasped to move the arm 32 in a counter-clockwise direction against the pressure of the spring 36, thereby removing the pin 39 from the confines of the recess 38 and permit the drum to be rotated.

The pin 39 may be suitably mounted in a mounting block 42 which is mounted on a cross member 43 extending across the bottom 20 of the outer drum.

The cross member 43 extends across the bottom 20 of the outer drum and terminates at the opposite end thereof adjacent the inwardly extending flange 19 on the lower end of the outer drum, as may be seen in FIG. 1. This opposite end of the cross member 43 is also provided with a similar mounting block 44 which supports a second outwardly-extending locking pin 45. When the operator places the objects to be transferred onto the bottom 20 through the aligned openings in the inner and outer drums, which will be their positions as shown in all figures of the drawings, he may then manually release the latching mechanism by grasping the knob 37 and pulling the arm 32 toward him to rotate it around its pivot pin 33. The locking pin 39 will then no longer be positioned within the recess 38, and the inner drum may then be rotated.

When the inner drum has been rotated through a sufficient distance, in this case approximately 180°, so that the arm 32 will be positioned on the opposite side of the structure, the second locking pin 45 will come against one of the cam surfaces 40 or 41 to rotate the arm 32 against the pressure of spring 36 until the recess 38 therein is opposite the outer end of the locking pin 45, whereupon the spring 36 will cause the arm 32 to snap back into locking position with the end of the pin 45 within the recess 38.

At this point the opening in the inner drum will be in alignment with the opening 13 in the outer drum and a person on the opposite side of a dividing wall in which the entire structure is mounted may remove the object which had been placed therein. If the objects are X-ray film cassettes, then he may remove the cassettes, unload the exposed film for processing and then reload the cassettes with unexposed film and replace the cassettes within the drums and release the latching mechanism so that the inner drum may be rotated back to its original position. As mentioned above herein, although not shown, one or both of the drums may be lead-lined when the structure is to be used for transferring unexposed X-ray film.

Figure 4:
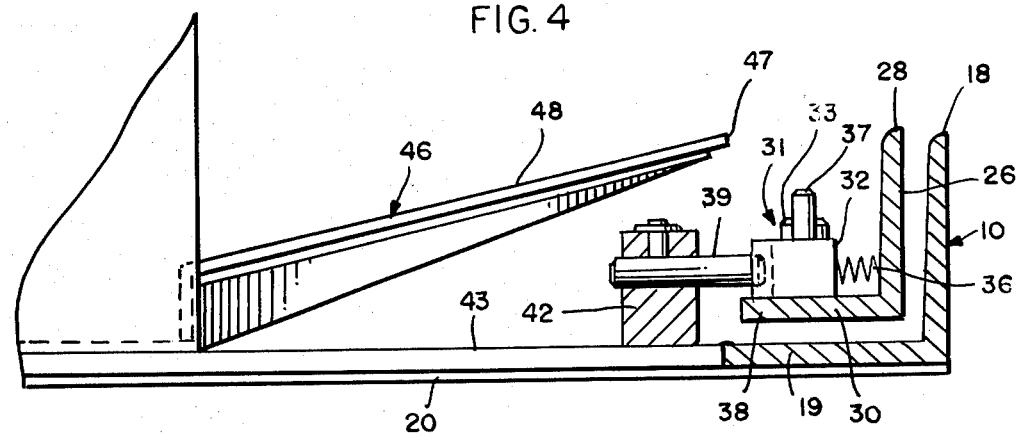
FIG. 4 is a side elevational view of the structure shown in FIG. 3, but including the ramp or safety shield to aid in preventing injury to the cassettes as they are being deposited or removed from the structure.

Another feature of the invention is the provision of suitable means to prevent the cassettes, or other objects being placed within the drums, from being damaged when they are being inserted through the aligned openings. For example, FIG. 4 shows the lower edge 18 of the opening 12 in the outer drum, and the lower edge 28 of the opening in the inner drum. When X-ray film cassettes are being handled, it is most important that they not be damaged during placement within the drums and removal therefrom. This is apt to happen, for example, if the cassettes are not raised up sufficiently high to clear these lower edges of the openings.

To prevent this from happening, a safety feature has been provided in the form of an inclined ramp generally indicated by the numeral 46. The outer edge of this ramp is curved to conform substantially to the curvature of the inner edges of the inwardly-extending flanges 19 and 30 of the outer and inner drums respectively. This outer curved edge of the ramp 46 is indicated by the numeral 47. As will be noted by viewing FIG. 4, this outer edge of the ramp is elevated so that it is in approximately the same horizontal plane with the lower edges of the openings in the inner and outer drums. The surface 48 of the ramp 46 is then inclined inwardly and downwardly from the outer curved edge thereof, as also shown in FIG. 4.

Thus, when any objects are inserted into the drums through the aligned openings therein, it will be necessary to raise the object high enough to clear the outer curved edge 47 of the ramp 46, and when this is done it follows that the lower edges of the openings will likewise be cleared and thereby prevent damage to the objects, such as the X-ray film cassettes.

A further feature of the invention involves the use of separate compartments within the drums into which the cassettes may be placed. In actual practice, the space within the drums is divided into a left-hand compartment and a right-hand compartment. In FIG. 2 the left-hand compartment is indicated by the numeral 49, and the right-hand compartment is indicated by the numeral 50. These compartments could be provided by a partition extending across the area of the interior, but in the present instance it is preferred that these compartments be formed by separate structures and then secured to the bottom of the outer drum by suitable means.

For example, it may be noted that the compartment 49 is comprised of the inner wall 51, the outer wall 52 and bottom wall not shown. There may also be a top wall if desired, but in any event, these walls are suitably mounted within the drums and secured to the bottom 20 of the outer drum. The right-hand compartment 50, as viewed in FIG. 2, is similarly constructed, but in this figure only the inner wall 54 may be seen.

Although a ramp 46 may be provided at both sides of the structure and in both compartments, if desired, it is only necessary that such ramp be provided in the compartment into which the cassettes are being inserted. Thus, when the exposed X-ray film cassette is being placed within the structure, it is preferably placed in the right-hand compartment 50, and for this reason, the ramp 46 is provided only at the entrance to such compartment. On the opposite side, after the X-ray film has been developed, and the cassette is to be returned to the operator on the first side of the structure, a similar ramp is provided at the entrance to the right-hand compartment as viewed from the opposite side of the drums. In this case, however, the right hand compartment will be that indicated by the numeral 49.

When the operator who developes the film sees the aligned openings in the inner and outer drums on his side of the dividing wall, the cassettes will be in his left-hand compartment, which will be the compartment heretofore indicated by the numeral 50. When cassettes are on this side, the operator knows that they have been exposed. He thereupon will remove the cassettes to develop the film, reload and replace the cassettes into the compartment on his right-hand side. Then, when the inner drum has been rotated so that its opening is in alignment with the opening in the outer drum on the first side, the operator may then see that the cassettes are in the compartment on his left-side, which indicates to him that the exposed film has been removed from the cassettes and developed, and the cassettes reloaded.

From the foregoing description, it will be apparent that I have provided a pass-through structure for transferring objects from one side of a dividing wall to the other which embodies novel features. These features enable the pass-through structure to be particularly adapted for use in connection with X-ray film cassettes, wherein exposed film is transferred from a first area to a second area where the film is to be processed.

Changes may be made in the form and the structure of the various parts described herein, without in any way departing from the spirit of the invention, provided, however, that such changes fall within the scope of the claims appended hereto.

I claim:

1. A pass-through structure for enabling X-ray film cassettes and the like to be transferred from one area to another through a dividing wall, comprising
    (a) an outer stationary drum adapted to be mounted in an opening in the said wall,
    (b) a first opening in said outer drum located on one side of the said wall,
    (c) a second opening in said outer drum located on the opposite side of the said wall,
    (d) a stationary supporting surface in said outer drum on which cassettes to be transferred may be placed through one of said openings,
    (e) an inner drum rotatably mounted within said stationary outer drum,
    (f) an opening in said inner drum adapted to be aligned with said first opening in said outer drum when in a first rotated position thereof, and aligned with said second opening in said outer drum when rotated to a second position thereof,
    (g) means providing two stationary compartments within said inner drum and around which said inner drum is adapted to rotate, and accessible through the openings in said outer drum and the opening in said inner drum when in alignment therewith,
    (h) whereby, cassettes deposited through aligned openings into one of said compartments and onto said supporting surface on one side of the wall when said inner drum is in one of said positions thereof, may be removed from the same compartment through aligned openings on the other side of the wall when said inner drum is in the other position thereof.

2. The combination of elements defined in claim 1 combined with releasable latch means for locking said inner drum in at least one of said rotated positions thereof.

3. The combination of elements defined in claim 2, wherein said releasable latch means includes a yieldable member having a recess therein, and a cooperating pin member adapted to be received by said recess, one of said members being mounted on said inner drum and rotatable therewith, and the other of said members being mounted on said supporting surface.

4. The combination of elements defined in claim 2, wherein said releasable latch means includes a spring-loaded detent member having a recess therein and pivotally mounted on said inner drum and rotatable therewith, and a stud mounted on said supporting surface adapted to be received by said recess when brought into alignment therewith.

5. The combination of elements defined in claim 1, combined with an inclined ramp member extending downwardly and inwardly from adjacent the lower edge of the opening in said inner drum toward said supporting surface, thereby to prevent the cassette from being damaged by striking said lower edge of said opening when the cassette is being inserted into the compartment.

6. A pass-through structure for enabling objects to be transferred from one area to another through a dividing wall, comprising
   (a) an outer stationary drum adapted to be mounted in an opening in the said wall,
   (b) a first opening in said outer drum located on one side of the said wall,
   (c) a second opening in said outer drum opposed from said first opening therein and located on the opposite side of the said wall,
   (d) a first inwardly extending annular flange around the bottom edge of said outer drum,
   (e) a stationary bottom member for said outer drum secured to said annular flange and on which objects to be transferred may be placed through one of said openings,
   (f) two stationary compartments positioned side-by-side on said bottom member opening toward both of said first and second openings in said outer drum,
   (g) an inner drum rotatably mounted within said outer stationary drum and having an opening therein adapted to be aligned with said first opening in said outer drum when in a first rotated position thereof, and aligned with said second opening in said outer drum when rotated to a second position thereof, whereby objects deposited into one of said compartments on said bottom member through aligned openings when said inner drum is in one position thereof, may be removed from the same compartment through aligned openings when said inner drum is in the other rotated position thereof,
   (h) a second inwardly extending annular flange around the bottom edge of said inner drum, and
   (i) cooperating latch means on said second inwardly extending annular flange and on said bottom member for locking said inner drum in at least one of said rotated positions thereof.

7. The combination of elements defined in claim 6, wherein said latch means includes
   (a) a stationary pin mounted on said bottom member, and
   (b) a yieldable member mounted on said second inwardly extending annular flange having a recess therein adapted to receive said pin when said inner drum is in one of said rotated positions thereof.

8. The combination of elements defined in claim 6, wherein said latch means includes
   (a) a first pin mounted on said bottom member between the side edges of said first opening in said outer drum,
   (b) a second pin mounted on said bottom member between the side edges of said second opening in said outer drum member, and
   (c) a yieldable member mounted on said second inwardly-extending annular flange and rotatable with said inner drum and having a recess therein adapted to receive said first pin when said inner drum is in the said first rotated position thereof, and to receive said second pin when said inner drum is in the said second rotated position thereof, thereby to lock said inner drum in either of the two rotated positions thereof.

* * * * *